United States Patent Office 3,076,687
Patented Feb. 5, 1963

3,076,687
PROCESS FOR THE PRODUCTION OF WATER-SOLUBLE DYESTUFFS AND DYEING CELLULOSE THEREWITH
Helmut Klappert, Koln-Stammheim, and Otto Bayer, Leverkusen-Bayerwerk, Germany, assignors to Farbenfabriken Bayer Aktiengesellschaft, Leverkusen, Germany, a corporation of Germany
No Drawing. Filed Mar. 20, 1959, Ser. No. 800,662
Claims priority, application Germany Apr. 16, 1958
9 Claims. (Cl. 8—54.2)

It has been found that water-soluble dyestuffs are obtainable by converting dyestuff pigments containing thiomorpholine or its C-substitution products linked via a sulphonamide grouping, into the water-soluble sulphonium groups with dialkyl sulphates or trialkyloxonium boron fluoride.

As dyestuff pigments a great variety of pigment dyestuffs are suitable such as the tetra-aza-porphines, phthalocyanines, azo dyestuffs, anthraquinone dyestuffs or oxazine dyestuffs. The sulphonamide linkage does not necessarily link directly the dyestuff molecule to the thiomorpholine, but other groups may be interposed. The production of the dyestuff pigments linked via a sulphonamide-like linkage to the thiomorpholine may be carried out, for example, by reacting dyestuffs containing one or more sulphochloride groups with thiomorpholine.

The dyestuffs may be reacted with thiomorpholine in an aqueous suspension. To bind the liberated hydrogen halide, the process can be carried out using an excess of thiomorpholine as well as in the presence of other acid binding agents such as pyridine or sodium bicarbonate. The reaction is advantageously performed at temperatures of 0° C. to approximately 25° C. It is advantageous to treat the thiomorpholine reaction products with the dialkyl sulphates or the trialkyl oxonium boron fluoride—said alkyl groups being preferably lower alkyl groups—which are used at least in an equimolecular ratio, preferably in excess, at elevated temperatures, for example at 80–110° C. in the presence or absence of solvents. The water-soluble sulphonium salt thus formed may be isolated from the reaction mixture, for example by precipitation with acetone. Suitable solvents are inter alia dioxan, glycol dimethyl ether, chlorobenzene, toluene or xylene.

Some of the sulphonium salts thus obtained are soluble in cold water and some in hot water. They draw onto materials consisting mainly of cellulose or regenerated cellulose such as cotton from a neutral bath and are split to given again the insoluble sulphonthiomorpholides by a usual alkaline after-treatment preferably at temperature about 100° C. By this method dyeings are obtained having very good fastness properties such as fastness to light, to boiling with soda, to wet treatment and perspiration and resistance to creasing and ironing.

The following examples are given for the purpose of illustrating the invention without limiting it thereto.

Example 1

12 g. of copper phthalocyanine are sulphochlorinated in 120 g. of chlorosulphonic acid at 135–140° C. The solution is poured onto ice and filtered off with suction, and the residue is washed neutral. The moist tetrasulphochloride is pasted with 100 cc. of ice water, cooled to 0° C. and 10 g. of thiomorpholine and 15 g. of pyridine are then added. The mixture is then stirred for 4–5 hours at 0° C. and subsequently at room temperature overnight. It is then filtered off with suction, washed with water and dried. Yield 21 g. of copper phthalocyanine tetrasulphothiomorpholide which is insoluble in a boiling dilute sodium carbonate solution.

10 g. of sulphothiomorpholide are stirred at 90–100° C. for 1 hour with 50 cc. of dimethyl sulphate, the solution is diluted with 250 cc. of acetone, the resultant sulphonium methyl sulphate of the tetramethylated copper phthalocyanine teterasulphothiomorpholide is separated, thoroughly washed with acetone and air-dried.

Yield: 13 g. of a blue powder which readily dissolves in water with a greenish blue colour.

Example 2

From 17 g. of 4,4′,4″,4′′′-copper-phthalocyaninetetrasulphonic acid (prepared by an urea melt of 4-sulphophthalic acid) treated at 80° C. with 120 g. of chlorosulphonic acid and 22 cc. of thionyl chloride, the tetrachloride is obtained. The moist sulphochloride is washed neutral and pasted with 100 cc. of ice water; the mixture is cooled to 0° C. and 10 g. of thiomorpholine and 4 g. of sodium bicarbonate are added. It is subsequently stirred at 0° C. for 4–5 hours and then at room temperature overnight. After filtering by suction, washing with water and drying, 17 g. of tetrasulphothiomorpholide are obtained. The product thus obtained is stirred at 90–100° C. for 2 hours in 80 cc. of diethyl sulphate, the sulphonium salt is precipitated with 400 cc. of acetone and air-dried. Yield: 23 g. of pale blue crystalls which readily dissolve in cold water with a bright blue colour. The dyeings on cotton have a somewhat more reddish shade than that obtained with the dyestuff described in Example 1. In place of the diethyl sulphate, an equivalent quantity of triethyl oxonium boron fluoride [$(C_2H_5)_3O]BF_4$) may be used.

Dyeing may be carried out in the following manner:
3 parts by weight of the dyestuff are dissolved in 2000 parts by weight of water containing 2 parts by weight of sodium acetate. 100 g. of a cotton yarn are treated in this dyebath for 40 minutes at a rising temperature and for a further 15 minutes at 90–100° C. The yarn is then rinsed and after-treated in an aqueous bath containing 5 cc./l. of sodium hydroxide 38° Bé. at 100° C. for 15 minutes. To remove the superficially adhering pigments, the yarn is vigorously soaped; it is then dyed a turquoise shade.

Dyeing may also be effected in the following manner:
A cotton fabric is impregnated at 25° C. on the foulard with an aqueous solution of 20 parts by weight of the dyestuff in 1000 parts by weight of water, squeezed and dried at 60–70° C. The fabric is subsequently after-treated at 100° C. in a winch vat for 15 minutes with a liquor containing 15 cc. of sodium hydroxide 38° Bé. per litre of water, and then soaped in conventional manner. The fabric is then dyed a turquoise blue.

Printing with the dyestuff may be carried out as follows:
A paste consisting of 40 g. of the dyestuff
40 g. of lactic acid
25 g. of trisodium phosphate
500 g. of tragacanth thickening
50 g. of sodium acetate
345 g. of water is printed on cotton or staple fibre. After the usual predrying at 60° C., the dyestuff is fixed on the fibre by neutral steaming in the Mather-Platt for 10 minutes. After treating the fabric in conventional manner, beautiful bright blue prints are obtained of excellent fastness properties such as fastness to light, boiling with soda and and to wet processing as well as resistance to creasing.

Example 3

When in the process described in Example 2 instead of 4,4′,4″,4′′′-copper phthalocyanine-tetrasulphonic acid there is used 4,4′,4″,4′′′-nickel phthalocyanine-tetrasulphonic acid, a dyestuff is obtained which dissolves with a green colour and dyes cotton in turquoise green shades having similar fastness properties as those of the dyestuff obtained according to Example 2, especially a good fastness to chlorine.

Example 4

The trisulphochloride from 4,4',4''-copper phthalocyanine-trisulphonic acid (prepared by an urea melt of 3 mols of 4-sulphophthalic acid and 1 mol of phthalic acid) is obtained according to the process described in Example 2. The moist sulphochloride is pasted with 100–200 cc. of water. 10 g. of thiomorpholine and 4 g. of sodium bicarbonate are then added at 0° C. and the mixture is stirred for 4–5 hours at 0° C. and then for some hours at room temperature. After filtering with suction, washing and drying, 19 g. of trisulphothiomorpholide are obtained. The product obtained is stirred at 90–100° C. for 1 hour in 100 cc. of dimethyl sulphate, and diluted with 400–500 cc. of acetone; the sulphonium salt is filtered off with suction, thoroughly washed with acetone and air-dried.

Yield: 27 g. of a pale blue powder which dissolves in cold water with some more difficulty than the dyestuff obtained according to Example 2.

Example 5

The sulphochloride of 20 g. of 4,4''-copper phthalocyanine-disulphonic acid (prepared by an urea melt of 2 mols of 4-sulphophthalic acid and 2 mols of phthalic acid) is reacted with thiomorpholine as described in Example 1. 16 g. of dry disulphothiomorpholide are thus obtained.

The product is stirred at 90–100° C. for 1–2 hours with 70 cc. of dimethyl sulphate, the sulphonium salt is then precipitated with acetone, filtered off with suction, washed with acetone and dried. 20 g. of a blue dyestuff are thus obtained which is scarcely soluble in cold water, but readily dissolves in hot water with a blue colour, and which dyes cotton in bright blue shades.

Example 6

11 g. of dibenzo-tetramethyl-tetra-azaporphine copper (prepared from 2 mols of 2-amino-5-imino-isoindolenine and 2 mols of 2-amino-5-imino-3,4-dimethylpyrrolenine) are reacted with chlorosulphonic acid as described in Example 1 to give the disulphochloride. The moist sulphochloride is washed neutral and pasted with 100 cc. of ice water. 10 g. of thiomorpholine and 4 g. of sodium bicarbonate are then added at 0° C. The mixture is subsequently stirred at 0° C. for 4–5 hours, and then at room temperature for several hours. After filtering with suction, washing and drying of the solid portions 15 g. of disulphothiomorpholide are obtained. They are treated at 90–100° C. for 1 hour with 80 cc. of dimethyl sulphate, and the dyestuff is then precipitated with acetone and isolated. Yield: 17 g. of greyish blue crystals which dissolve in water with a dark blue colour, dyeing cotton in grey-blue shades.

Instead of dibenzo-tetramethyl-tetra-azaporphine copper there may also be used dibenzo-dimethyl-diethyl-tetraaza-porphine copper or nickel or dibenzo-ditetra-hydrobenzo-tetra-aza-porphine copper. Dyestuffs giving similar shades are thus obtained.

Example 7

10 g. of the azo dyestuff of the following formula

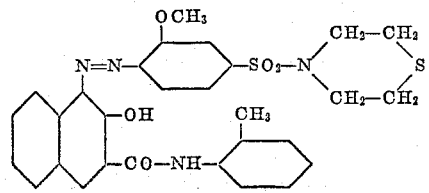

obtained by coupling diazotised 2-amino-anisole-4-sulphothiomorpholide with 2-hydroxy-naphthoic acid(3)-2-toluidide are stirred at 90–100° C. for 1 hour with 60 cc. of dimethyl sulphate. The sulphonium salt is then precipitated with acetone and isolated.

12 g. of a dark red dyestuff are obtained which is scarcely soluble in cold water, but dissolved in hot water with a bright red colour and dyes cotton in bright red shades.

Instead of the above dyestuff the following azo dyestuffs may be used which dye cotton in the shades indicated below

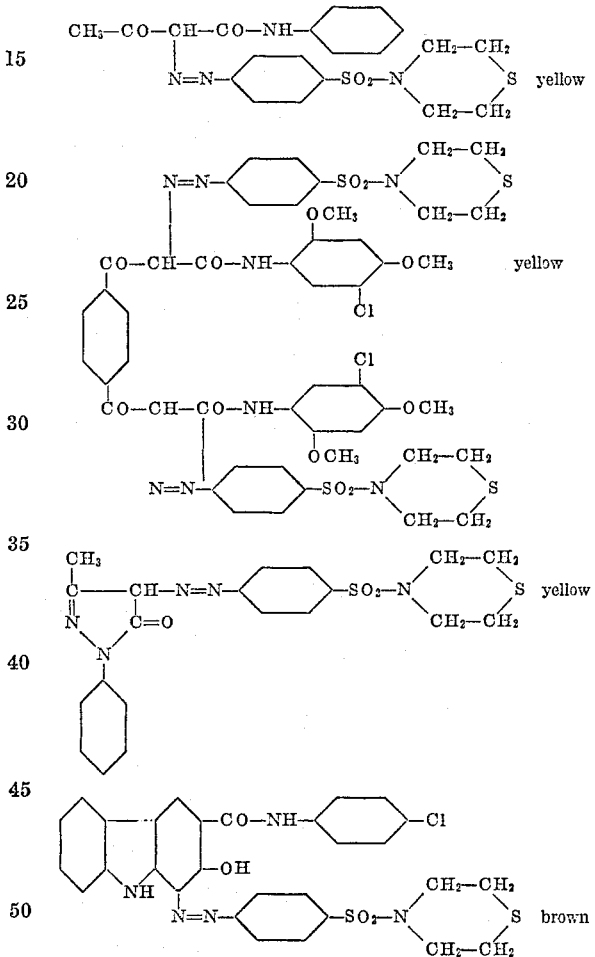

Example 8

10 g. of disulphothiomorpholide of the following formula

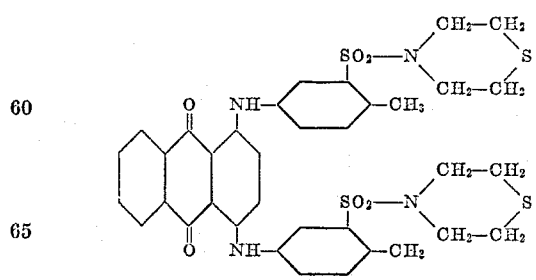

prepared from the disulphochloride of 1,4-di-p-toluido-anthraquinone and thiomorpholine are heated to 90–100° C. for 1–2 hours with 80 cc. of dimethyl sulphate. The sulphonium salt is precipitated with acetone. 12 g. of a greyish black dyestuff powder are obtained which dissolves in water with a grey-blue colour and dyes cotton in grey-green shades.

Instead of the above dyestuff, the following dyestuffs may be used which dye cotton in the shades indicated below:

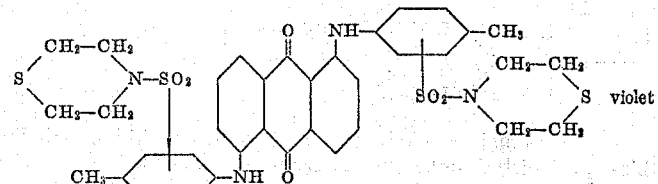
violet

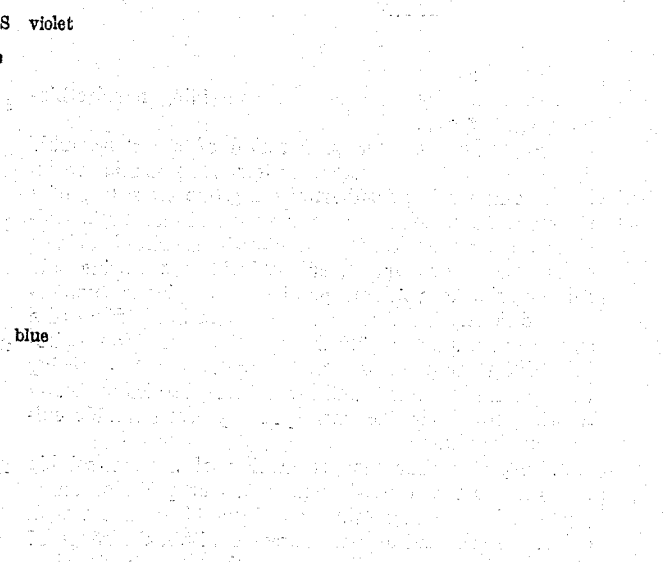
blue

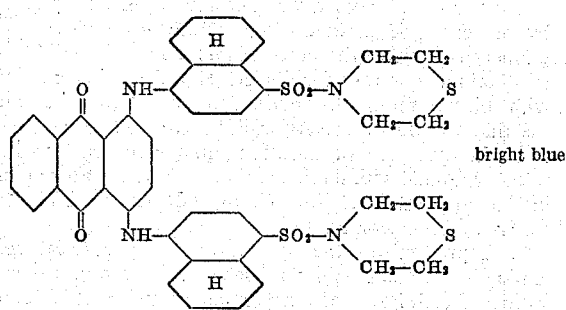
bright blue (prepared by converting tetrasulphonic acid into the tetrasulphochloride and reacting it with thiomorpholine) are heated to 90–100° C. for 1–2 hours with 80 cc. of dimethyl sulphate. The sulphonium salt is then precipitated with acetone yielding dark blue crystals, and isolated.

13 g. of a dark blue dyestuff are obtained which dissolve in warm water with a deep blue colour and dye cotton in reddish blue shades.

Instead of the above dyestuff, the following dyestuffs may be used which dye cotton in the shades indicated below:

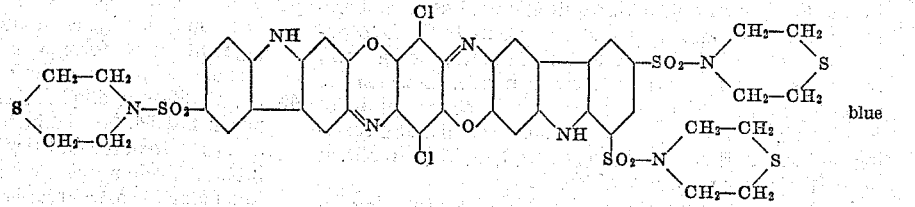
blue

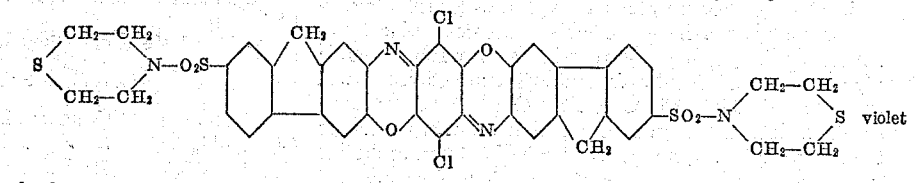
violet

*Example 9*

10 g. of the tetrasulphothiomorpholide of an oxazine dyestuff of the following formula

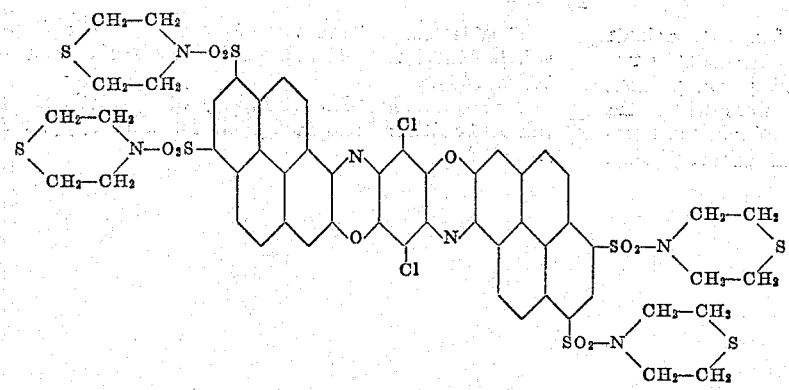

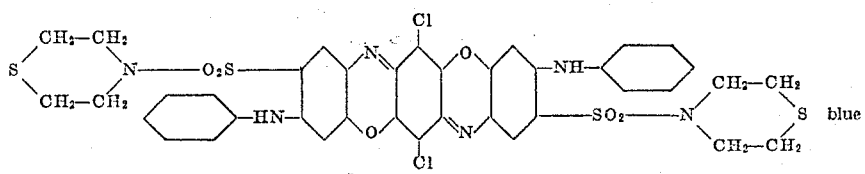

We claim:

1. A phthalocyanine dyestuff containing a sulfothiomorpholide group.

2. A process for the preparation of a water-soluble dyestuff from a water-insoluble pigment comprising reacting a compound selected from the group consisting of a metal phthalocyanine, a tetra-aza-porphine, anthraquinone, and an oxazine dyestuff, with chlorosulfonic acid to obtain the corresponding sulfochloride, converting said sulfochloride to a thiomorpholide, in which the thiomorpholine moiety is linked to said pigment in the form of a sulfonamide, and reacting the resulting sulfothiomorpholide with a compound selected from the group consisting of lower dialkyl sulfate and lower trialkyl oxonium boron fluoride, to obtain the corresponding water-soluble sulfonium dye salt.

3. A process for the preparation of a water-soluble dyestuff from a water-insoluble copper phthalocyanine pigment by reacting said water-insoluble pigment with chlorosulfonic acid at a temperature within the range of about 135° C. to 140° C. to obtain the tetrasulfochloride, and thereafter reacting with thiomorpholine to obtain a thiomorpholide in which the thiomorpholine moiety is linked to said copper phthalocyanine pigment in the form of a sulfonamide, and reacting said thiomorpholide with dimethyl sulfate at a temperature within the range of about 90° C. to 100° C. to obtain the water-soluble tetramethylated copper phthalocyanine tetrasulfothiomorpholide.

4. A process for the preparation of a water-soluble dyestuff from a water-insoluble 4,4',4'',4''' copper phthalocyanine tetrasulfonic acid pigment by reacting said water-insoluble pigment with chlorosulfonic acid at a temperature within the range of about 135°C. to 140° C. to obtain the tetrasulfochloride, and thereafter reacting with thiomorpholine to obtain a thiomorpholide, in which the thiomorpholine moiety is linked to said copper phthalocyanine pigment in the form of a sulfonamide, and reacting said thiomorpholide with ($[(C_2H_5)_3O]BF_4$) to obtain the corresponding water-soluble salt.

5. A process for the preparation of a water-soluble dyestuff from a water-insoluble nickel phthalocyanine tetrasulfonic acid pigment by reacting said water-insoluble pigment with chlorosulfonic acid at a temperature within the range of about 135° C. to 140° C. to obtain the tetrasulfochloride, and thereafter reacting thiomorpholine to obtain the thiomorpholide in which the thiomorpholine moiety is linked to said copper phthalocyanine pigment in the form of a sulfonamide, and reacting said thiomorpholide with diethyl sulfate at a temperature within the range of about 90° C. to 100° C. to obtain the water-soluble sulfonium salt.

6. A process for the prepartion of a water-soluble dyestuff from water-insoluble dibenzo-tetramethyl-tetra-aza-porphine copper pigment by reacting said pigment with chloro-sulfonic acid at a temperature within the range of about 135° C. to 140° C. to obtain the tetrasulfochloride, and thereafter reacting with thiomorpholine to obtain a thiomorpholide in which the thiomorpholine moiety is linked to said aza-porphine pigment in the form of a sulfonamide, and reacting said thiomorpholide with diethyl sulfate at a temperature within the range of about 90° C. to 100° C. to obtain the water-soluble sulfonium salt.

7. A process for the preparation of a water-soluble dyestuff from a water-insoluble 1,4-di-para-toluido-anthraquinone pigment by reacting said water-insoluble pigment with chlorosulfonic acid at a temperature within the range of about 135° C. to 140° C. to obtain the tetrasulfochloride, and thereafter reacting with thiomorpholine to obtain a thiomorpholide in which the thiomorpholine moiety is linked to said toluido anthraquinone pigment in the form of a sulfonamide, and reacting said thiomorpholide with diethyl sulfate at a temperature within the range of about 90° C. to 100° C. to obtain the water-soluble sulfonium salt.

8. A process for the preparation of a water-soluble ozazine dyestuff from a water-insoluble oxazine pigment by reacting said pigment with chlorosulfonic acid at a temperature within the range of about 135° C. to 140° C. to obtain the tetrasulfochloride, and thereafter reacting with thiomorpholine to obtain a thiomorpholide in which the thiomorpholine moiety is linked to said oxazine pigment in the form of a sulfonamide, and reacting said thiomorpholide with diethyl sulfate at a temperature within the range of about 90° C. to 100° C. to obtain the water-soluble sulfonium salt.

9. A process for the dyeing of textile material containing at least one member selected from the group consisting of cellulose and regenerated cellulose which comprises converting a water-insoluble pigment as employed in claim 2, having a thiomorpholine moiety linked to said pigment in the form of a sulfonamide, and treating said pigment with a member selected from the group consisting of di-lower alkyl sulfate and tri-lower alkyl oxonium boron fluoride to obtain the water-soluble sulfonium salt and then treating said textile material with said water-soluble sulfonium salt and subjecting said textile material to an alkaline after-treatment.

References Cited in the file of this patent

UNITED STATES PATENTS

| 2,419,334 | Conn et al. | Apr. 22, 1947 |
| 2,744,105 | Barney | May 1, 1956 |
| 2,841,577 | Strobel et al. | July 1, 1958 |
| 2,883,373 | Bossard et al. | Apr. 21, 1959 |
| 2,938,896 | Strobel et al. | May 31, 1960 |

OTHER REFERENCES

Venkataraman: "The Chemistry of Synthetic Dyes," vol. 1, Academic Press Inc., publ., New York, 1952, pp. 475 and 697.

Venkataraman: "The Chemistry of Synthetic Dyes," vol. 2, Academic Press Inc., publ., N.Y., 1956, pp. 1138 and 1139.